Nov. 3, 1925.
H. F. MORGAN
DRIVING MECHANISM
Filed March 7, 1925
1,559,578
3 Sheets-Sheet 3
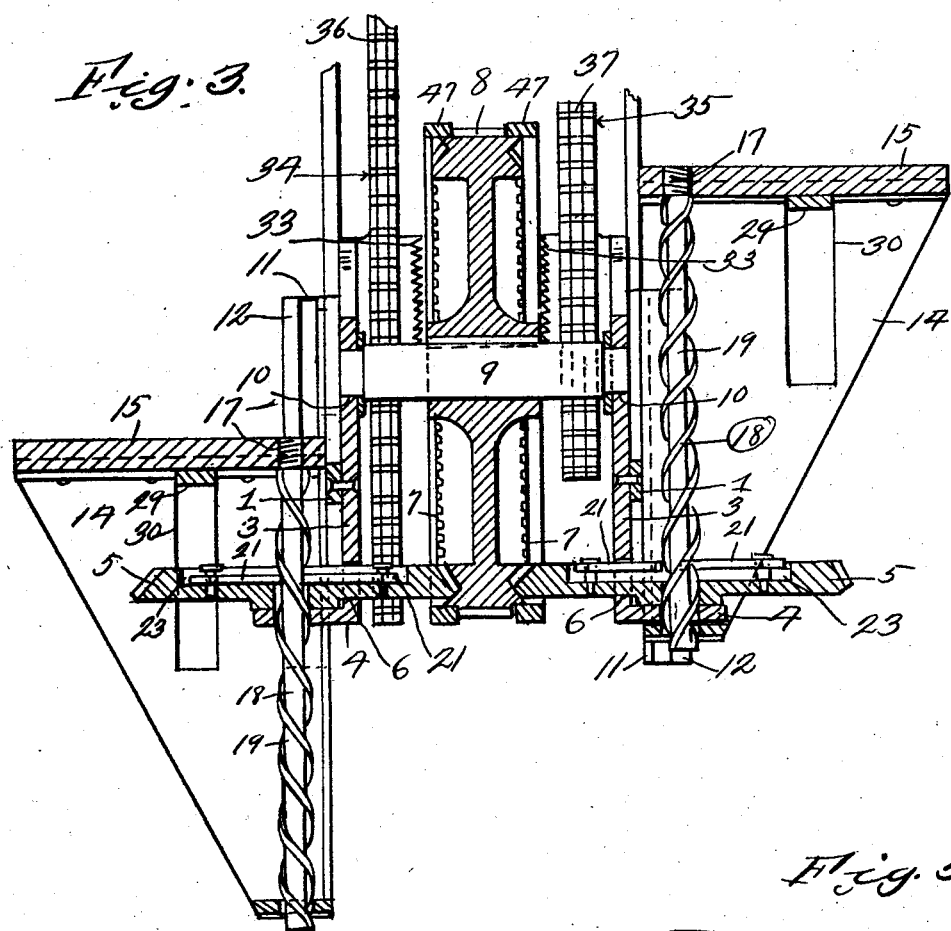
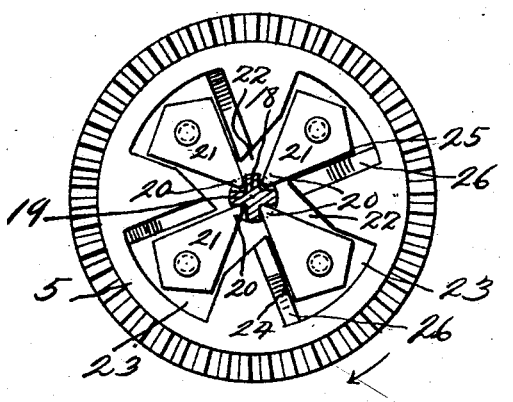
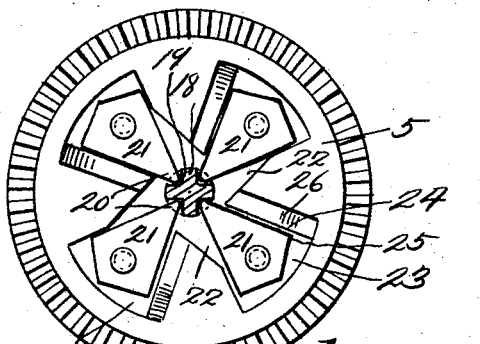
Inventor
H. F. Morgan
By D. Swift
Attorney Patented Nov. 3, 1925.

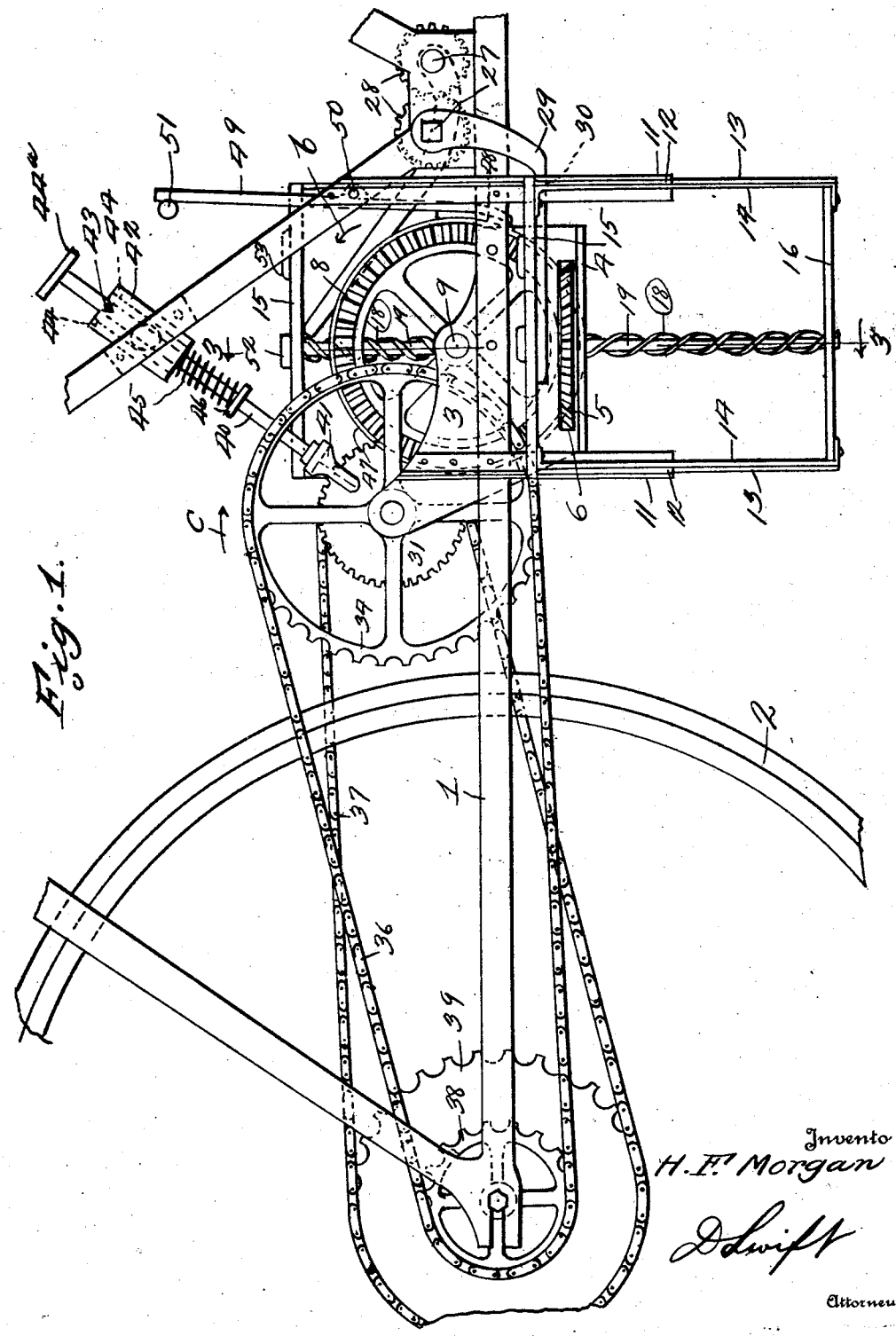

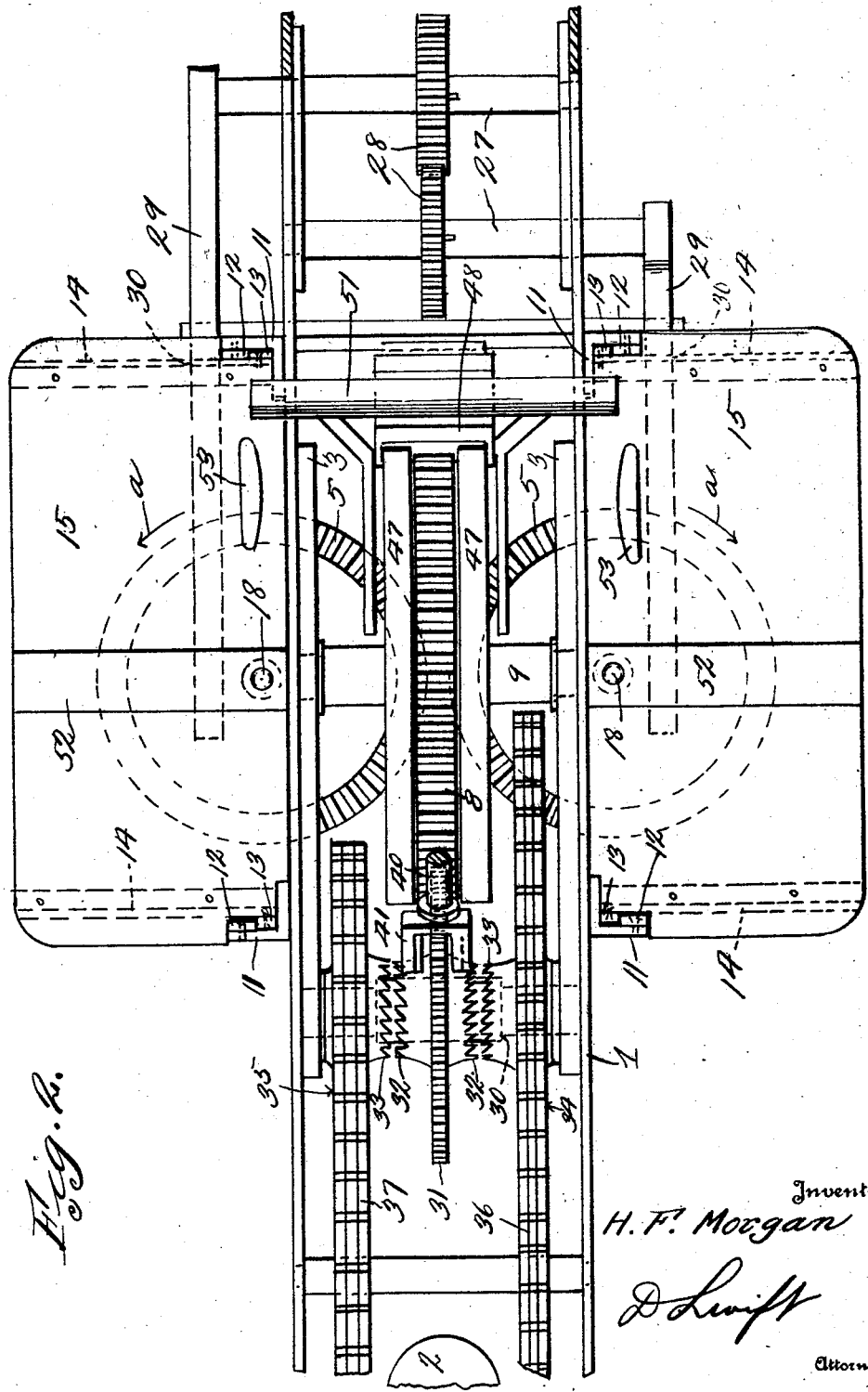

1,559,578

UNITED STATES PATENT OFFICE.

HUMPHREY F. MORGAN, OF NEWARK, NEW JERSEY.

DRIVING MECHANISM.

Application filed March 7, 1925. Serial No. 13,812.

*To all whom it may concern:*

Be it known that I, HUMPHREY F. MORGAN, a citizen of the United States, residing at Newark, in the county of Essex, State of New Jersey, have invented a new and useful Driving Mechanism; and I do hereby declare the following to be a full, clear, and exact description of the invention, such as will enable others skilled in the art to which it appertains to make and use the same.

The invention relates to driving mechanisms particularly adapted for use in connection with bicycles, tricycles and other wheeled manually driven vehicles, and has for its object to provide depressible members adapted to be forced downwardly by the feet of the operator for forcing spiral shafts through clutches carried by horizontally disposed gears for intermittently rotating said gears and imparting rotation to a main drive gear with which the horizontally disposed gears mesh.

A further object is to provide the horizontally disposed drive gears with clutch mechanisms whereby upon the downward movement of the spiral shafts the horizontally disposed drive gears will be rotated, and upon the upward movement of the spiral shafts the horizontally disposed gears will be out of clutched engagement with the spiral shafts, thereby allowing easy return with the minimum amount of friction of the spiral shafts, and depressible members carried thereby to raised position for starting another driving stroke.

A further object is to provide means whereby when one depressible member is forced downwardly the other depressible member will be forced upwardly, and which means comprises meshing gears having arms which engage the under sides of the depressible members, and geared together in relation to each other, whereby when one arm is in raised position the other arm is in lower position.

A further object is to provide brake means cooperating with the central main drive gear periphery for acting as a brake for the mechanism.

A further object is to provide a transversely disposed countershaft adjacent the main drive gear, and on which countershaft is slidably mounted, as well as rotatably mounted, a double clutch member having a gear meshing with the main drive gear, and which double clutch member is adapted to be shifted transversely into clutching engagement with clutch members carried by sprockets of different sizes rotatably mounted on the transversely disposed countershaft for obtaining different speeds of rotation of the driving wheel through sprocket chain connections with sprockets of different size carried by the drive wheel.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the driving mechanism showing the same applied to a bicycle structure.

Figure 2 is a top plan of the propelling mechanism.

Figure 3 is a transverse sectional view through the propelling mechanism taken on line 3—3 of Figure 1.

Figure 4 is a top plan view of one of the drive gears showing the clutch mechanism cooperating with the spiral shaft.

Figure 5 is a top plan view of the other horizontal drive gear, showing the pivoted clutch members in position to be thrown out of engagement with the spiral shaft upon the starting of the upward movement of the spiral shaft.

Referring to the drawing, the numeral 1 designates spaced side bars of a bicycle frame, between the rear ends of which is rotatably mounted a ground engaging wheel 2. Secured to the inner sides of the bars 1 are vertically disposed plates 3, the lower ends of which terminate in horizontally disposed flanges 4, on which are rotatably mounted bevelled horizontally disposed drive gears 5, which drive gears extend through openings 6 in the plates 3 adjacent their lower ends, and have their adjacent sides meshing with bevelled gears 7 carried by opposite sides of the main drive gear 8, and which drive gear is mounted on a transversely disposed shaft 9, the ends of which are rotatably mounted in bearings 10 of the plates 3. Secured to the outer sides of the bars 1 are vertically disposed angle bars 11, and which angle bars have their outwardly extending flanges provided with vertically disposed strips 12 behind which the vertically disposed strips carried by the plates 14 are slidably mounted, and which plates 14 are connected together at their upper ends by horizontally disposed tread plates 15, on which the operator places his feet for operating the device. It will be noted the tread members and the plates 14 carried thereby are vertically guidable in their movement in the angle bars 11, therefore the tread members will be positively guided as they reciprocate upwardly and downwardly. Plates 14 have their lower ends connected together by horizontally disposed bars 16, which bars 16 maintain the plates 14 in spaced parallel position at all times. Connected at 17 to the under sides of the tread members 15 are downwardly extending operating shafts 18, which operating shafts are provided with spiral grooves 19 which receive the noses 20 of pivoted clutch members 21, and which clutch members, during the downward movements of the operating shafts 18 slide through the grooves 19 thereof and cause the bevelled drive gears 5 to be rotated outwardly away from each other away from the arrows a in Figure 2, therefore it will be seen the main drive gear 8 will be rotated in the direction of the arrow b, Figure 1. When the tread members 15 start on their upward strokes, consequently the drive shafts 18 start upwardly, the pivoted clutch members 21 will be pivotally moved into the portions 22 of the recesses 23 in the gears 5, and will assume positions where their noses 20 will be out of the grooves 19 in the operating shafts, consequently the gear 5, which is not used for driving may rotate freely on the upwardly moving operating shaft without having driving connection therewith. It will be noted that the clutch operation takes place immediately upon the downward movement of the spiral shafts, and the declutching operation takes place immediately upon the upward movement of the shafts 18. In operation the operator depresses one tread 15 and then the other for imparting intermittent rotation to the gears 5, and through said gears 5 imparting a continuous rotation of the main drive gear 8 in the direction of the arrow b. On the downward movements of the operating shafts 18, the pivotal movement of the pivoted clutch members 21 in the recesses 23 are limited in one direction by means of adjacent walls 24 of the recesses 23, thereby maintaining the noses 20 in the grooves 19 of the drive shafts 18 during the downward movements thereof. In operation as the shafts 18 start their upward movement the clutch members 21 are partially rotated by the shafts and are raised slightly for facilitating the movement thereof to inoperative positions in the portions 22 of the recesses 23, and are returned to clutching position when the operating shafts reach the upper ends of the stroke by the engagement of the corners 25 of the clutch members 21 with the bevelled cam surfaces 26 at the sides of the recess 23 and by gravity. By providing the vertically movably spiral operating shafts 18 cooperating with the gears 5 in the manner set forth, it is obvious that a maximum amount of power is obtained, and the weight of the operator of a bicycle may be utilized for operating the device, thereby allowing the maximum amount of power to be obtained with the minimum amount of exertion.

Rotatably mounted in the spaced bars 1 of the frame, forwardly of the main drive gear 8 are transversely disposed parallel shafts 27, which shafts 27 are provided with gears 28, which mesh with each other. Shafts 27 outside of the bars 1 are provided with rearwardly extending arms 29, which arms extend through vertically elongated recesses 30 in the rear plates 14 and engage the under sides of the tread members 15. Arms 29, when the device is assembled, are positioned in engagement with the under sides of the tread members 15, when said tread members are in depressed and raised positions as clearly shown in Figure 1, therefore it will be seen that when one of the tread members 15 is forced downwardly, the arm 29, which is forced downwardly by said depressed tread member, will rotate the meshing gears 28, in a manner whereby the opposite arm 29 will be forced upwardly in engagement with the under side of the other tread member 15, thereby raising said last named tread member to its raised position. It is to be noted that at no time do the operating shafts rotate and that the rotation of the horizontal drive gears 5 is solely through the camming action of the spiral thread when depressed with the pivoted clutch members 21.

Disposed rearwardly of the main drive gear 8 is a countershaft 30, and on which countershaft 30 is rotatably mounted a gear 31 which meshes with the main drive gear 8 and is provided with oppositely disposed clutch members 32, which are adapted to be shifted into cooperative engagement with the clutch members 33 carried by the large sprocket 34 and the small sprocket 35 for imparting rotation to said sprockets in the direction of the arrow c, Figure 1, according to the speed desired. Extending over the sprockets 34 and 35 are sprocket chains 36 and 37, which sprocket chains extend rearwardly and over sprockets 38 and 39 of different sizes which are carried by the wheel 2 of the bicycle, therefore it will be seen by shifting the gear 31 to either side, the drive wheels 2 may be driven through either sprocket 34 or 35 for obtaining different speeds or gearing which is of particular advantage where the device is used in a hilly country or in a level country. Gear 31 is shifted through means of the rotatable shaft 40, the lower end of which is provided with a bifurcated member 41, the arms of which engage opposite sides of the gear 31 upon a partial rotation of the shaft 40, however any kind of a gear shifting device may be used. Shaft 40 is rotatably mounted in a sleeve 42 carried by the frame of the bicycle and is provided with a pin 43 which cooperates with notches 44 in the upper end of the sleeve for holding the shaft in any position to which it may be rotated, and with a crossed member 44 adapted to be engaged by the foot of the operator for manipulating the shaft and clutch. The shaft 40 is normally forced downwardly by means of a coiled spring 45 interposed between the lower end of the sleeve 42 and the collar 46 of the shaft, therefore it will be seen that the spring 45 will maintain the pin 43 in any notch to which it may be moved. Secured to the outer periphery of the main drive gear 8, adjacent its opposite sides, and preferably by shrinking thereon, are brake drum rings 47, and with which brake drum rings the brake shoe 48 cooperates for acting as a brake for the device. The brake shoe 48 is carried by the lower end of a brake lever 49 which is pivotally connected at 50 to the frame of the bicycle and is provided at its upper end with a transversely disposed bar 51, adapted to be engaged by the foot of the operator for forcing the brake shoe 40 into frictional engagement with the band 47. The upper sides of the tread members 15 are preferably provided with transversely disposed bars 52 against which the forward side of the heel of the operator engages and with longitudinally disposed upwardly extending ribs 53 adapted to engage the inner sides of the soles of the shoes of the operator, and prevent inward movement of the feet of the operator, and the bars 52 prevent forward movement of the feet of the operator, therefore it will be seen that the operator's feet will be maintained in a fixed permanent position on the tread members for obtaining the maximum amount of power, and in a position where the feet will not work inwardly, during the operation of the device, to a position where they will interfere with the downward movement of the tread members.

The present application is a continuation of my application for patent filed December 19, 1921, Serial No. 523,396, allowed March 10, 1923.

From the above it will be seen that an operating mechansm is provided for wheeled vehicles, particularly manually propelled ones, which mechanism is simple in construction, positive in its operation, the parts reduced to a minimum and one wherein rotation is provided to the driving gears through the reciprocation of worm screws, thereby obtaining maximum amount of power. It will also be seen that several speeds may be obtained through the shifting of the clutch mechanism.

It will also be seen that two speeds may be obtained through the shifting of the clutch mechanism, and four or more sets of the worm shafts can be made with the worm or spiral at a greater or less angle which would change the speeds on the bicycle when another set of worm shafts was screwed into position for operation. The sets may be so that they are interchangeable, by changing the worm shafts the speeds would be numerous.

The invention having been set forth what is claimed as new and useful is:—

1. A driving mechanism comprising vertically movable tread members, lever and gear connections between said tread members, whereby when one is forced downwardly the other will be forced upwardly, vertically disposed worm shafts carried by the tread members and movable therewith, horizontally disposed drive gears through which the worm shaft extends, clutch connections between the drive gears and worm shafts whereby upon a downward movement of one worm shaft one of the drive gears will be driven and upon a downward movement of the other worm shaft it will be in declutched relation to the drive gear, a main drive gear between the tread members, said first mentioned drive gears meshing with the main drive gear, a driven wheel and driving connections between the main drive gear and the driven wheel.

2. The combination with a driving mechanism for wheeled vehicles and comprising a main drive gear having drive connections with a wheel, horizontally disposed drive gears meshing with gears carried by opposites sides of the main drive gear, of means for rotating the main drive gear through the horizontally disposed drive gears, said means comprising vertically disposed slidable frames above the horizontal gears, tread members carried by said frames, link and gear connections between the frames whereby when one frame moves downwardly the other frame will be forced upwardly, of worm shafts carried by the tread members and extending through the horizontal gears and clutch members carried by the horizontal gears and cooperating with the worm shafts whereby upon a downward movement of the worm shafts the horizontal gears will be rotated and upon upward movement of the worm shafts the horizontal gears will rotate freely on the worm shafts.

3. The combination with a device of the character described comprising a main drive gear driven by oppositely disposed horizontally disposed gears meshing with opposite sides of the main drive gear, of means for rotating the horizontally disposed gears for driving the main drive gear, said means comprising vertically movable tread members, means for forcing one tread member upwardly when the other tread member is forced downwardly, vertically disposed worm shafts carried by the tread members and extending through the horizontally disposed gears and means carried by said horizontally disposed gears and cooperating with the worm shafts, whereby upon a downward movement of the worm shafts the horizontally disposed gears will be rotated and upon an upward movement of the worm shafts the horizontally disposed gears will freely rotate on the worm shafts.

4. The combination with a device of the character described comprising a main drive gear and oppositely disposed horizontally disposed gears meshing with gears carried by opposite sides of the main drive gear, tread members vertically movable above the horizontally disposed gears, of axially movable worm gears carried by the tread members and extending through the horizontally disposed gears and clutch members carried by the horizontally disposed gears and cooperating with the worm shafts whereby upon downward movement of the worm shafts the horizontally disposed gears will be rotated and upon upward movement of the shafts the gears will rotate freely on the worm shafts.

5. The combination with a driving device of the character described and comprising of horizontally disposed drive gears, of means for rotating said drive gears, said means comprising vertically movable tread members, oppositely threaded shafts extending through said gears and carried by the tread members and clutch means carried by the gears and cooperating with the threaded shafts whereby upon reciprocation of the threaded shafts the gears will be positively rotated by the shafts or allowed to freely rotate on the shafts.

6. The combination with a driving device of the character described and comprising horizontally disposed drive gears, of means for rotating said drive gears, said means comprising vertically movable tread members, oppositely threaded shafts extending through said gears and rigidly carried by the thread members, pivoted members carried by the gears, one of the ends of said pivoted members being adapted to be received between the thread of the threaded shafts during the downward movement thereof for imparting rotation to the gears, means for limiting the pivotal action of the pivoted members during the driving operation and means whereby upon upward movement of the threaded shafts said pivoted members will be allowed to move out of cooperative engagement with the shafts and the gears allowed to freely rotate on the shafts.

7. In a driving device, a supporting frame, a pair of vertically reciprocatory members supported thereon and each being adapted to be actuated by foot power, a driven rotatable member supported on the frame, a driving rotatable member also supported on the frame, means providing a driving connection between the driving rotatable member and the driven member, and means arranged to be actuated by the reciprocatory members to occasion the rotation of the driving member, said last named means comprising a pair of vertical worm shafts respectively carried by said reciprocatory members, each of said worms being mounted in its respective reciprocatory member against rotation, a worm wheel for each worm, each worm wheel being supported on the frame for rotation and being held against axial movement, and each worm being provided with a bore receiving its respective worm shaft in such a manner as to be in mesh with the worm while permitting axial movement of the latter relatively thereto, and gears secured to the driving member and engaged by the worm wheels.

8. The combination with a bicycle of a driving device comprising a pair of vertically reciprocatory foot plates supported at opposite sides of the frame, a driven shaft journalled in the frame, two sprockets of different diameters rotatably mounted on the driven shaft and each having a hub provided with clutch teeth in the inner end thereof, a gear feathered on the driven shaft and provided with a hub having clutch teeth in opposite ends thereof, means providing independent driving connections between said sprockets and the traction wheel of the bicycle, means for shifting the gear in opposite directions at will to effect the rotation of either sprocket when the driven shaft is rotated, and means arranged to be actuated by the foot plates for rotating the driven shaft.

9. The combination with a bicycle of a driving device comprising a pair of vertically reciprocatory foot plates supported at opposite sides of the frame, a driven shaft journalled in the frame, two sprockets of different diameters rotatably mounted on the driven shaft and each having a hub provided with clutch teeth in the inner end thereof, a gear feathered on the driven shaft and provided with a hub having clutch teeth in opposite ends thereof, means providing independent driving connections between said sprockets and the traction wheel of the bicycle, means for shifting the gear in opposite directions at will to effect the rotation of either sprocket when the driven shaft is rotated, and means arranged to be actuated by the foot plates for rotating the driven shaft, said last named means including a vertical worm carried by each foot plate and held against rotation, and means arranged to be actuated by each worm during the downward movement of its supporting foot plate for imparting a torque to the driven shaft.

10. In a driving device, a supporting frame, a driven rotatable member supported on the frame, a worm wheel supported on the frame for rotation and held against axial movement, said worm wheel having a pivoted toothed bore, a worm reciprocating in the direction of its length through the bore of the worm wheel and in mesh with the teeth of said bore, said pivoted teeth cooperating with the worm whereby the worm wheel will be rotated upon a downward movement of the worm and will freely rotate on the worm upon an upward movement of the worm.

In testimony whereof I have signed my name to this specification.

HUMPHREY F. MORGAN.